United States Patent
Lin

(10) Patent No.: US 10,521,182 B2
(45) Date of Patent: Dec. 31, 2019

(54) METHOD AND TERMINAL FOR CONTROLLING GROUPING PLAY OF PLAYING SYSTEM

(71) Applicant: Guangdong Oppo Mobile Telecommunications Corp., Ltd., Dongguan, Guangdong (CN)

(72) Inventor: Shangbo Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 161 days.

(21) Appl. No.: 15/371,941

(22) Filed: Dec. 7, 2016

(65) Prior Publication Data

US 2017/0090856 A1    Mar. 30, 2017

Related U.S. Application Data

(63) Continuation of application No. PCT/CN2015/096065, filed on Nov. 30, 2015.

(30) Foreign Application Priority Data

Jul. 29, 2015    (CN) .......................... 2015 1 0464601

(51) Int. Cl.
G06F 3/16        (2006.01)
G06F 3/0482    (2013.01)
G06F 3/14        (2006.01)

(52) U.S. Cl.
CPC ............ *G06F 3/162* (2013.01); *G06F 3/0482* (2013.01); *G06F 3/14* (2013.01); *G06F 3/165* (2013.01)

(58) Field of Classification Search
CPC ... H04L 12/2803–2838; H04L 2012/284–285; G08C 2201/30–34; G06F 3/048; H04R 2227/005
See application file for complete search history.

(56) References Cited

U.S. PATENT DOCUMENTS

2010/0299639 A1*  11/2010  Ramsay ................ G06F 3/0486
                                                            715/835
2013/0067328 A1*  3/2013  Salyards .......... H04N 21/26258
                                                            715/716
(Continued)

FOREIGN PATENT DOCUMENTS

CN          104115466 A        10/2014
CN          104126309 A        10/2014
(Continued)

OTHER PUBLICATIONS

Extended European Search Report issued in corresponding European application No. 15893542.9 dated Feb. 6, 2018.

*Primary Examiner* — Jennifer N To
*Assistant Examiner* — Liang Y Li
(74) *Attorney, Agent, or Firm* — Young Basile Hanlon & MacFarlane, P.C.

(57) ABSTRACT

The present disclosure provides a method and a terminal for controlling grouping play of a playing system. A playlist is set independently of a playing device group, and one or more playlists can be applied to one or more playing device groups according to actual needs. Add or removal of the playlist with regard to the playing device group can be achieved via operations on a graphic label of the playing device group and a graphic label of the playlist on a user interface of a terminal.

9 Claims, 9 Drawing Sheets

(56) References Cited

U.S. PATENT DOCUMENTS

| | | | |
|---|---|---|---|
| 2013/0078990 A1* | 3/2013 | Kim | H04N 21/41407 455/422.1 |
| 2013/0346859 A1 | 12/2013 | Bates et al. | |
| 2014/0075308 A1* | 3/2014 | Sanders | G06F 17/30772 715/716 |
| 2014/0176298 A1 | 6/2014 | Kumar et al. | |
| 2014/0181656 A1* | 6/2014 | Kumar | H04L 12/6418 715/716 |
| 2014/0310316 A1 | 10/2014 | Coburn, IV et al. | |

FOREIGN PATENT DOCUMENTS

| | | |
|---|---|---|
| CN | 104583998 A | 4/2015 |
| CN | 104778959 A | 7/2015 |
| CN | 105096990 A | 11/2015 |

\* cited by examiner

METHOD AND TERMINAL FOR CONTROLLING GROUPING PLAY OF PLAYING SYSTEM

CROSS-REFERENCE TO RELATED APPLICATIONS

This application is a continuation of International Application No. PCT/CN2015/096065, filed on Nov. 30, 2015, which claims the priority to Chinese patent application No. 201510464601.2, filed on Jul. 29, 2015, the disclosures of both of which are herein incorporated by reference in their entireties.

TECHNICAL FIELD

The present disclosure relates to intelligent terminal technology, and particularly to a method and a terminal for controlling grouping play of a playing system.

BACKGROUND

With the development of intelligent terminals, intelligent home equipments and so on, a playing system can be composed of multiple playing devices integrated with network communication function, and the playing devices within the playing system can constitute a network. The playing system can couple to Internet and acquire Internet playing files there from; alternatively, the playing system can play playing files stored locally or playing files from other accessible devices in a local area network (LAN). The playing system can be controlled via an intelligent terminal such as a smart phone; the intelligent terminal can access and control the playing system and push the playing files on the Internet to the playing system to play.

Multiple playlists can be created in the playing system, and information of songs can be stored in each playlist. The information includes the name of a song, the memory address of a song and so on. The use of each playlist may not be the same, for example, some playlists may be used to play in the morning while others can be used to play in the evening; similarly, some playlists may be used to play in a living room while others may be used to play in a bedroom.

Currently, the play group and the playlist are closely related to each other; in other words, each play group has a playlist correspondingly. Users can add songs to a playlist or add or combine one playlist to playlists of a play group. It is inconvenient for the user to edit the play group and/or the playlist. For example, when adjusting play groups of a music system, all playlists corresponding to the adjusted play group will be deleted or combined. However, sometimes, such deletion or combination is undesired by user.

SUMMARY

Disclosed herein are implementations of a method for controlling grouping play of a playing system, the playing system comprising at least one playing device group and each playing device group comprises at least one playing device, the at least one playing device within the at least one playing device group configured to connect via a wireless network, comprising receiving an adding or removing operation of a first playing device list with regard to a first playing device group on a user interface of a terminal, wherein the user interface comprises a graphic label of the at least one playing device group and a graphic label of at least one playing device list, and the graphic label of the at least one playing device list is configured to have an exclusive identification respectively, controlling to add or remove an identification of the first playing device list to or from a graphic label of the first playing device group, controlling the first playing device group to add the first playing device list to play device lists of the first playing device group or remove the first playing device list from playing device lists of the first playing device group, and controlling at least one playing device within the first playing device group to play playing files of the first playing device list which has been added to the playing device lists of the first playing device group in sequence or stop playing the playing files of the first playing device which has been removed.

Disclosed herein are also implementations of a terminal for controlling grouping play of a playing system, the playing system comprising at least one playing device group and each playing device group comprising at least one playing device, the at least one playing device within the at least one playing device group configured to connect via a wireless network, comprising one or more processors, a memory, configured to store program codes, wherein when executed by the one or more processors, the program codes are adapted to cause the one or more processors to perform the following program units: a receiving unit, configured to receive an adding or removing operation of a first playing device list with regard to a first playing device group on a user interface of a terminal, wherein the user interface comprises a graphic label of the at least one playing device group and a graphic label of at least one playing device list, and the graphic label of the at least one playing device list is configured to have an exclusive identification respectively, a first controlling unit, configured to control to add/remove an identification of the first playing device list to or from a graphic label of the first playing device group, a second controlling unit, configured to control the first playing device group to add the first playing device list to play device lists of the first playing device group or remove the first playing device list from playing device lists of the first playing device group, and a third controlling unit, configured to control at least one playing device within the first playing device group to play playing files of the first playing device list which has been added to the playing device lists of the first playing device group in sequence or stop playing the playing files of the first playing device which has been removed.

Disclosed herein are also implementations of a method for controlling grouping play of a playing system, the playing system comprising at least one playing device group and each playing device group comprising at least one playing device, comprising receiving an adding operation of a first playing device list with regard to one or more playing device groups, controlling to add an identification of the first playing device list to graphic labels of the one or more playing device groups respectively, controlling the one or more playing device groups to add the first playing device list to play device lists of the one or more playing device groups respectively, and controlling at least one playing device within the one or more playing device groups to play playing files of the first playing device list which has been added to playing device lists of the one or more playing device group in sequence.

BRIEF DESCRIPTION OF THE DRAWINGS

In order to illustrate the technical solutions of the present disclosure more clearly, a brief description of the accompanying drawings used herein is given below. Obviously, the drawings listed below are only examples and a person skilled in the art should be noted that, other drawings can also be obtained on the basis of these exemplary drawings without creative activity.

DETAILED DESCRIPTION

Technical schemes of the present disclosure will be described clearly and completely in conjunction with accompanying drawings. The implementations illustrated below are merely part rather than all of the present disclosure. Any other implementation obtained by one skilled in the art based on the implementations described herein without creativity work should fall into the protective scope of the present disclosure.

A playing system applicable to the technical schemes of the present disclosure will be described.

The playing system composed of multiple playing devices can work as a whole, that is, all playing devices within the playing system play the same playing file synchronously. The playing system can be divided into several play groups either, among which each play group can play different playing files respectively. For example, there are six playing devices in a music system, that is, Playing Devices A, B, C, D, E, and F, among which Playing Devices A and B constitute Play group 1, Playing Devices C and D constitute Play group 2, and Playing Devices E and F constitute Play group 3. Playing Devices A and B in Group 1 will play the same song synchronously, Playing Devices C and D in Group 2 will play the same song synchronously, and similarly, Playing Devices E and F in Group 3 will play the same song synchronously. However, these three groups are independent of each other and they can play the same or different song. These groups can be controlled by the same or different terminal. Each play group can have an independent playlist separately, or, two or more play groups can share one playlist, that is to say, two or more play groups can play a song in a playlist synchronously.

In practice, one playlist can be applied to one or more play groups, but one play group can invoke one playlist only at the same time point. For instance, in the music system, there are Play group 1, Play group 2, and Play group 3, and Playlist A, Playlist B, Playlist C, and Playlist D are created by user. Play group 1, Play group 2, and Play group 3 can be configured to play Playlist A synchronously; or, Play group 1 can be configured to play Playlist A, while Play group 2 and Play group 3 can be configured to play Playlist B; or, those three play groups can be configured to play different playlist respectively.

Methods for controlling grouping play of a playing system according to implementations of the present disclosure will be described in detail with refer to FIG. 1-FIG. 5.

Implementation 1

Figure 1:
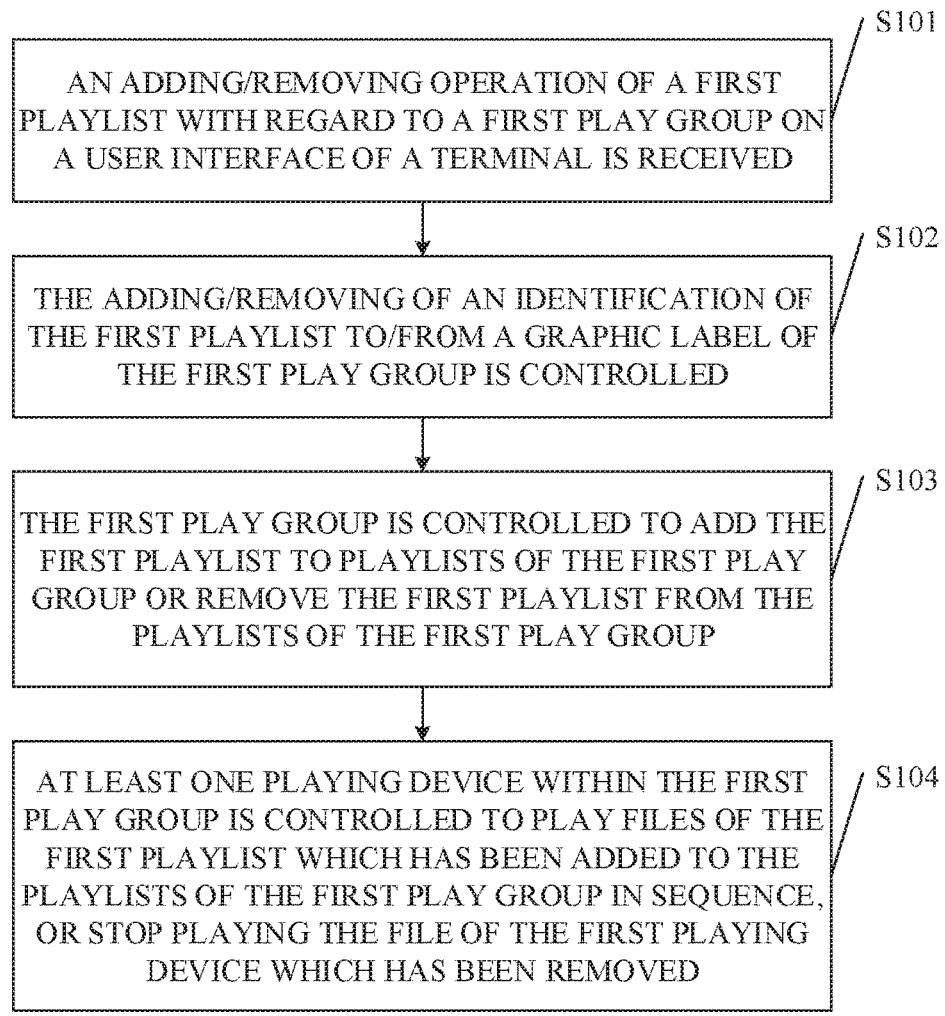
FIG. 1 is a schematic flow chart illustrating a method for controlling grouping play of a playing system according to an implementation of the present disclosure.

FIG. 1 is a schematic flow chart illustrating a method for controlling grouping play of a playing system according to an implementation of the present disclosure. The playing system includes at least one play group and each play group includes at least one playing device; the at least one playing device within the at least one play group is connected via a wireless network. The method can begin at block 101.

At block 101, an adding/removing operation of a first playlist ("playlist" can be referred to as "playing device list" either) with regard to a first play group on a user interface of a terminal is received.

In this implementation, each play group within the playing system is controlled through an intelligent terminal. Play groups and playlists are set independently. As reflected on the user interface of the terminal, a graphic label of one or more play groups and a graphic label of one or more playlists are displayed thereon; each play group or playlist is displayed as a graphic label occupying a certain display area on the user interface, the graphic label is generally rectangular, or can be designed to have a circular or other shapes.

According to this implementation, one or more play groups (can be referred to as "playing device group" either) can be created for a playing system, and one or more playing devices can be included in each play group. As to a playing device which does not belong to any play group, it will be regarded as an independent play group. Name and status information of a play group (mainly, name and status information, such as playing or pause, of a currently played playing file in the play group) is displayed in the graphic label thereof. If a play group has no playlist, the status information of the group will be null. Through clicking the graphic label of the play group, user can enter into an information interface of the play group, on which more detailed information of the playing device will be displayed, and through the information displayed, user can know which playing devices constitute the play group, and can browse or edit playlists of the play group and so on.

According to this implementation, one or more playlists can be created for a playing system, and each playlist includes information of several playing files which can be played by playing devices of the playing system. Playing file information includes name and memory address of a corresponding playing file. The playlist is set independently of the play group and does not relate to the play group. The graphic label of each playlist can adopt a unique identification, which can be the pattern or color of the graphic label.

Figure 2A:
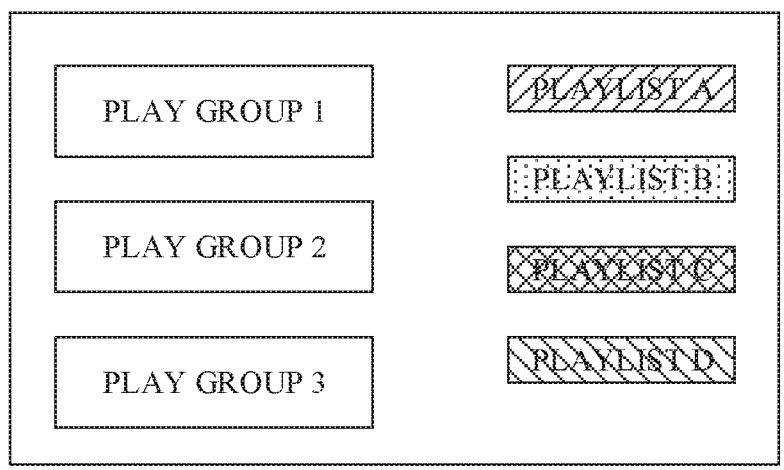
FIG. 2a-FIG. 2c are schematic diagrams illustrating operations on playlists with regard to play groups on a user interface of a terminal according the implementation illustrated in FIG. 1.

A user interface is shown in FIG. 2a, on the left side thereof are graphic labels of Play group 1-3, and on the right side are graphic labels of Playlist A-D. The graphic label of an idle play group is null. Graphic labels of Playlist A-D are identified through different patterns respectively.

Figure 2B:
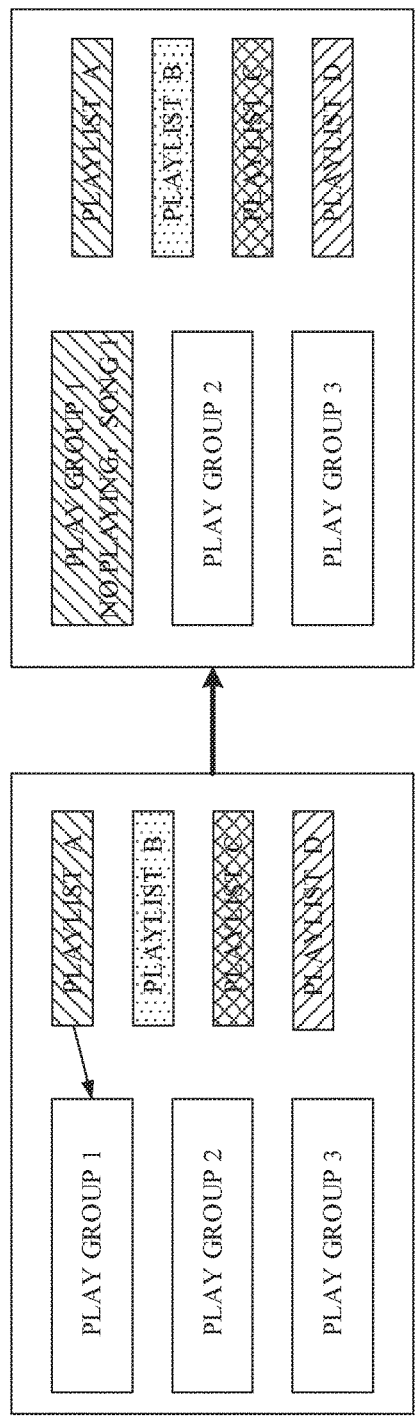

As shown in FIG. 2b, Playlist A is being dragged to Play Group 1 on the user interface by user, and then a control terminal will receive an adding operation of Playlist A with regard to Play Group 1 on the user interface thereof. Removing operation, that is, dragging from Play group 1 to playlist A, is an opposite operation of adding operation and will be described in detail later.

At block 102, the adding/removing of an identification of the first playlist to/from a graphic label of the first play group is controlled.

After receiving the adding operation of Playlist A with regard to Play Group 1 on the user interface of the terminal, the control terminal will control to add the identification of Playlist A to the graphic label of Play group 1. Further refer to FIG. 2*b*, the result obtained by dragging Playlist A to Play Group 1 is illustrated on the right side of FIG. 2*b*, as shown in the figure, the pattern of Playlist A is displayed in the graphic label of Play group 1.

At block 103, the first play group is controlled to add the first playlist to playlists of the first play group or remove the first playlist from the playlists of the first play group.

After adding the pattern of Playlist A to the graphic label of Play group 1, the terminal will be triggered to control Play group 1 to add Playlist A to the existing playlists of Play group 1. Removing is an opposite operation, that is, remove Playlist A from the playlists of Play group 1.

At block 104, at least one playing device within the first play group is controlled to play playing files of the first playlist which has been added to the playlists of the first play group in sequence, or stop playing the playing file of the first playing device which has been removed.

After adding Playlist A to Play Group 1, Playlist A will be arrayed in the playlists of Play group 1 according to a predetermined rule, for example, arrayed after the existing playlists of Play group 1. One or more playing devices within Play group 1 will play playing files within the playlists of Play group 1 in sequence. If Playlist A is removed from the playlists of Play group 1 and if a playing file of Playlist A is being played by a playing device of Play group 1, proceed to a playing file of the next playlist arrayed after Playlist A to play.

Figure 2C:
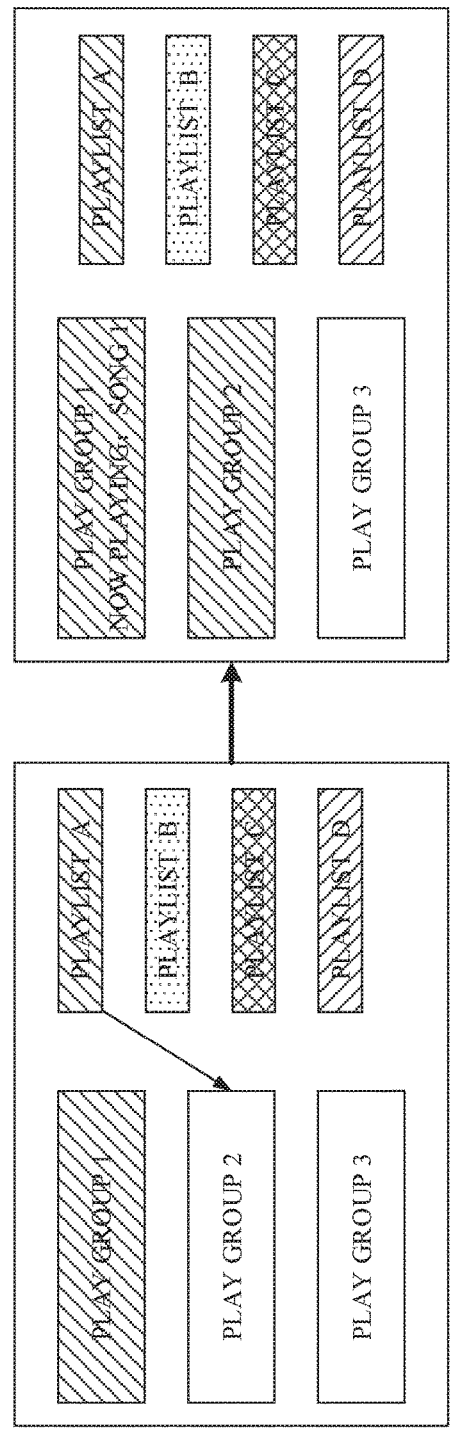

One playlist can be added to different play groups. As shown in FIG. 2*c*, in addition to Play Group 1, Playlist A can be added to Play Group 2 either.

Operations such as add or deletion on playing devices within Play group 1 have no affects on playlists, and no adjustment on the playlists is needed.

As can be seen from the method for controlling grouping play described in the above implementation, a playlist is set independently of a play group, and one or more playlists can be applied to one or more play groups according to actual needs. Adjustment on the play group can be achieved without affecting the playlist. Add or removal of the playlist with regard to the play group can be performed through operations on a graphic label of the play group and a graphic label of the playlist on a user interface of a terminal.

Implementation 2

Figure 3:
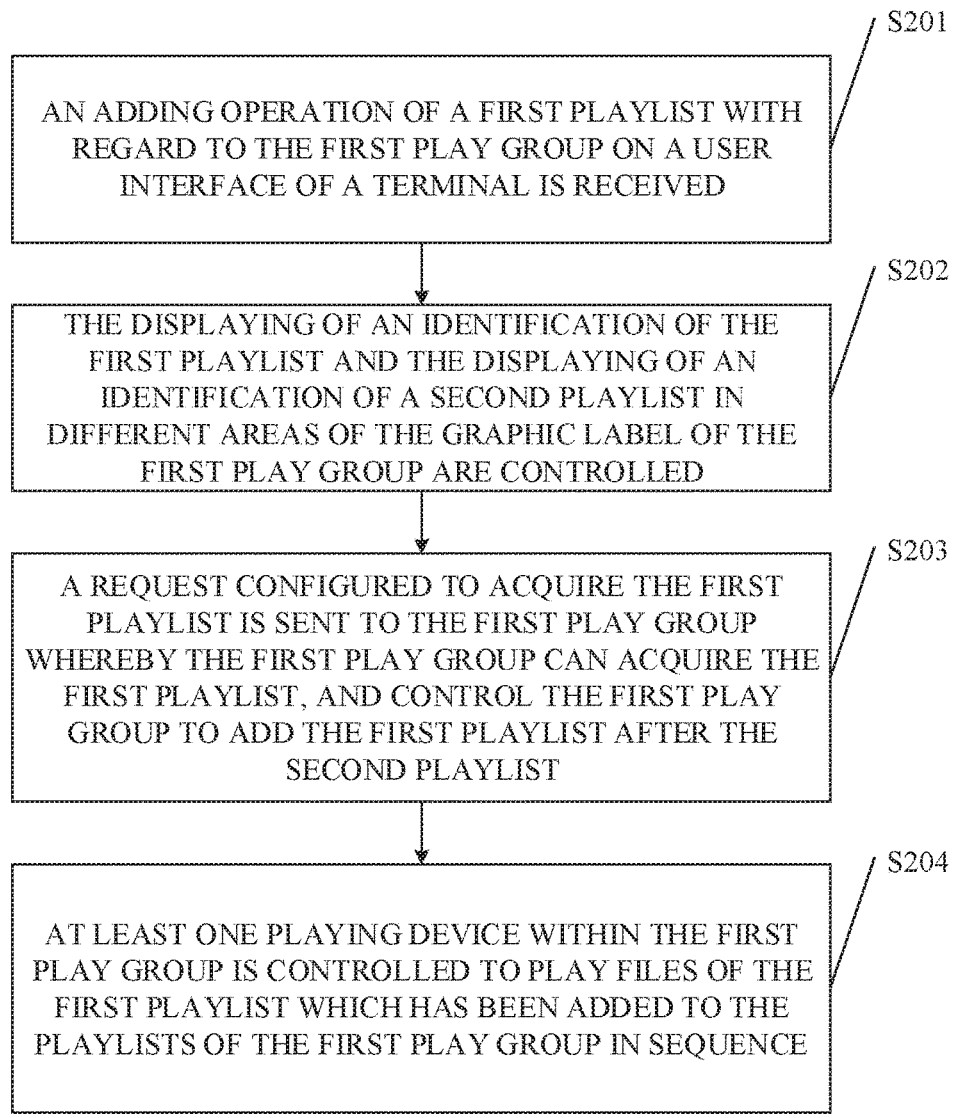
FIG. 3 is a schematic flow chart illustrating another method for controlling grouping play of a playing system according to an implementation of the present disclosure.

FIG. 3 is a schematic flow chart illustrating another method for controlling grouping play of a playing system according to an implementation of the present disclosure, wherein the playing system includes at least one play group and each play group includes at least one playing device; the at least one playing device within the at least one play group is connected via a wireless network.

In this implementation, the playing device lists of the first playing device group already includes a second playing device list, and an identification of the second playing device list is displayed on the graphic label of the first playing device group. A difference between this implementation and the implementation described above lies in that, this implementation relates to add multiple playlists to the same play group. The method can begin at block 201.

At block 201, an adding operation of a first playlist with regard to the first play group on a user interface of a terminal is received.

At block 202, the displaying of an identification of the first playlist and the displaying of an identification of a second playlist in different areas of the graphic label of the first play group are controlled.

Figure 4A:
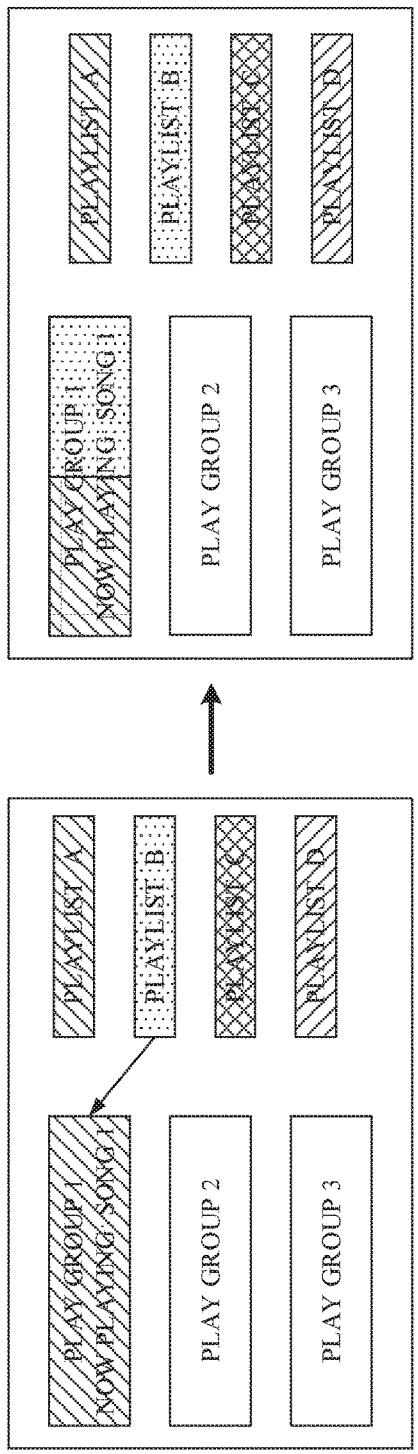
FIG. 4a-FIG. 4c are schematic diagrams illustrating operations on playlists with regard to play groups on a user interface of a terminal according to the implementation illustrated in FIG. 3.
Figure 4B:
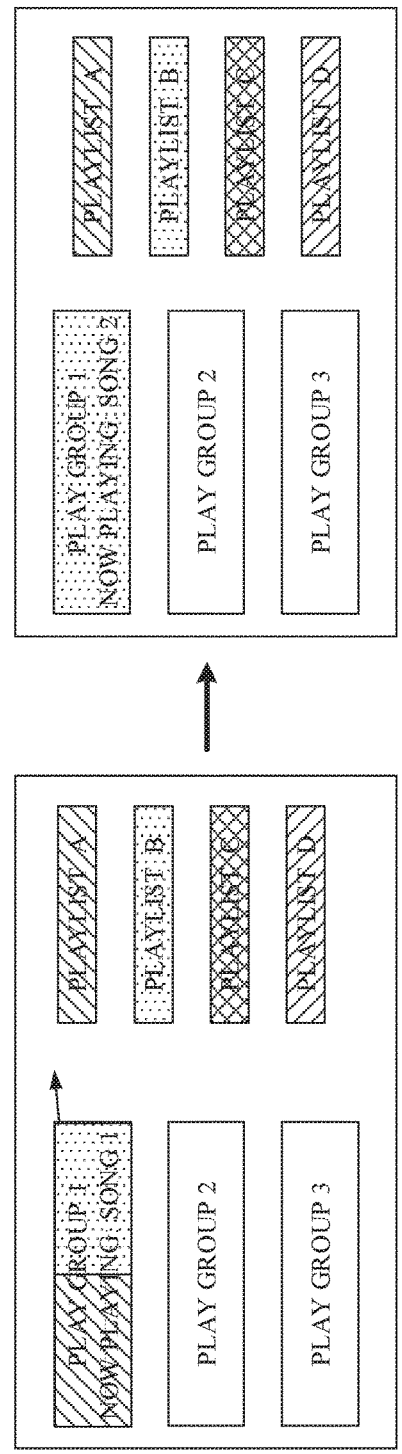

As shown on the left side of FIG. 4*a*, Playlist A is already included in playlists of Play group 1; in this case, the graphic label of Playlist B can still be dragged such that the pattern thereof can be dragged into Play Group 1. After identifying the dragging operation, the terminal will receive the adding operation of Playlist B with regard to Play Group 1. After dragging, as shown on the right side of FIG. 4*a*, a pattern of the existing Playlist A and a pattern of the new Playlist B are displayed respectively in different areas of the graphic label of Play group 1.

At block 203, a request configured to acquire the first playlist is sent to the first play group whereby the first play group can acquire the first playlist, and control the first play group to add the first playlist after the second playlist.

After the pattern of Playlist B is displayed in the graphic label of Play group 1, trigger to send a request configured to acquire Playlist B to Play Group 1, whereby Play group 1 can acquire Playlist B and add Playlist B after the existing Playlist A. Playlists can be stored in a memory of the playing system, a cloud server, a terminal, or some playing device. Any play group can acquire a playlist based on a memory address thereof.

At block 204, at least one playing device within the first play group is controlled to play playing files of the first playlist which has been added to the playlists of the first play group in sequence.

Playlist B is added after the existing Playlist A by Play group 1, after that, playing devices in Play group 1 will be controlled to play each playing file in Playlist A and Playlist B in sequence synchronously.

Similarly, removing operation on a playlist can also be conducted. As shown on the left side of FIG. 4*b*, through dragging Playlist A of Play group 1 to any blank place on the user interface, the terminal can receive a removing operation on Playlist A with regard to Play Group 1. As shown on the right side of FIG. 4*b*, after dragging, only the pattern of Playlist B is displayed in the graphic label of Play group 1 and Playlist A has been removed from playlists of Play group 1.

Figure 4C:
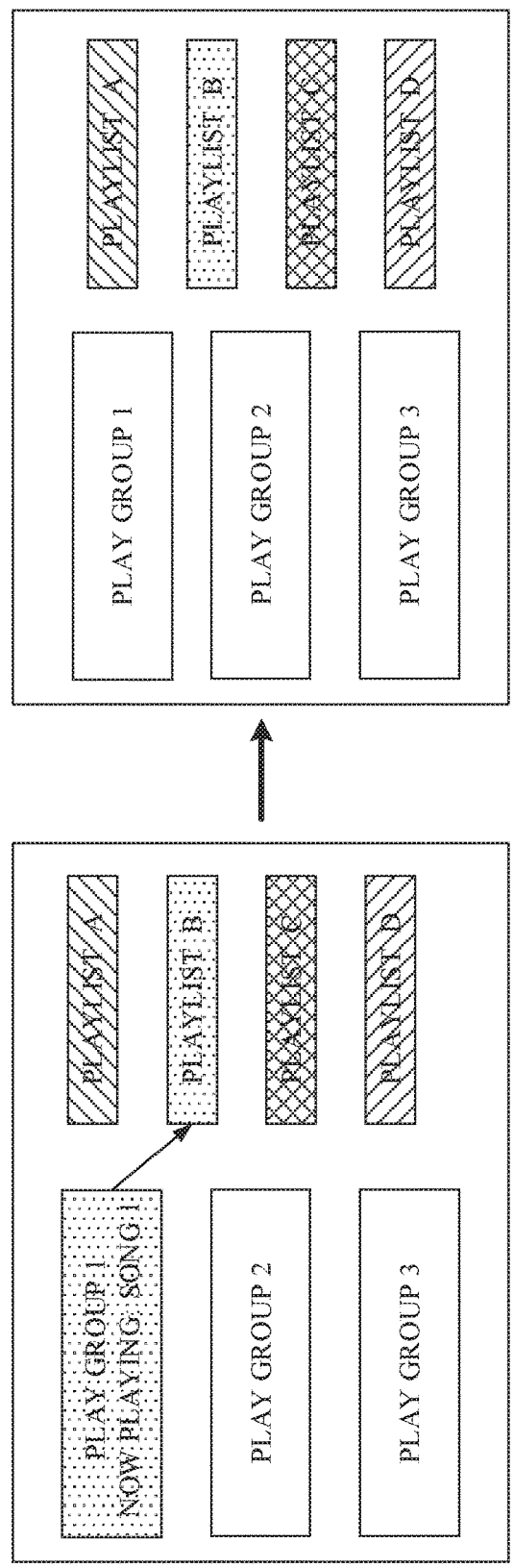

As shown on the left side of FIG. 4*c*, removing operation on Playlist B with regard to Play Group 1 can be conducted either. Through dragging Playlist B of Play group 1 to any blank place on the user interface, the terminal can receive the removing operation on Playlist B with regard to Play Group 1; as shown on the right side of FIG. 4*c*, after dragging, the graphic label of Play group 1 is blank, and at this time, playlists of Play group 1 are null.

As can be seen from the method for controlling grouping play described in the above implementation, a playlist is set independently of a play group, and one or more playlists can be applied to one or more play groups according to actual needs. Adjustment on the play group can be achieved without affecting the playlist; through operations on a graphic label of the play group and a graphic label of the playlist on the user interface of the terminal, one or more playlists can be added to the play group. The new playlist can be arrayed after the existing playlists according to a predetermined setting. Playing devices in the play group take turns to play playing files of each playlist.

Implementation 3

Figure 5:
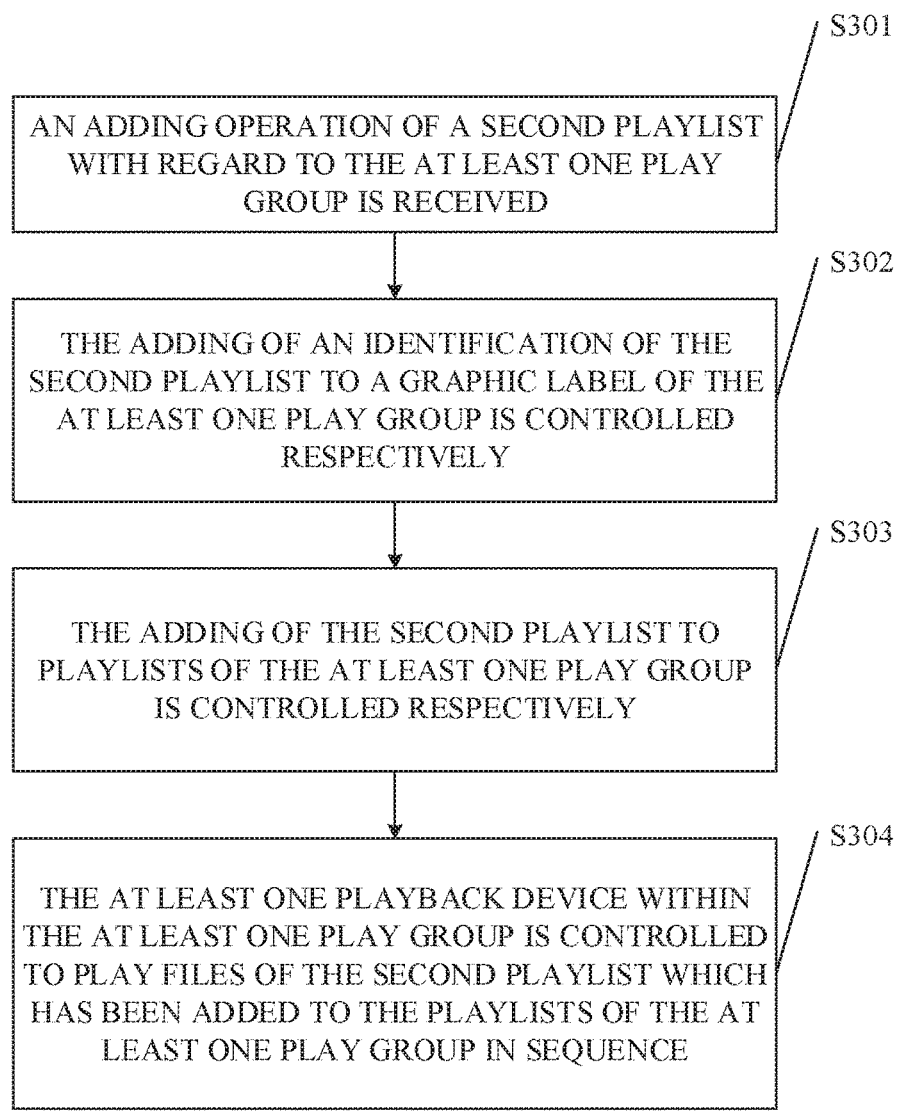
FIG. 5 is a schematic flow chart illustrating another method for controlling grouping play of a playing system according to an implementation of the present disclosure.

FIG. 5 is a schematic flow chart illustrating another method for controlling grouping play of a playing system according to an implementation of the present disclosure, wherein the playing system includes at least one play group and each play group includes at least one playing device; the at least one playing device within the at least one play group is connected via a wireless network.

A difference between the present implementation and the implementations described above lies in that, the present implementation relates to add the same playlist to multiple play groups to play, in contradistinction, in implementation 1 or implementation 2, the playlist is added to one play group.

The method can begin at block 301.

At block 301, an adding operation of a second playlist with regard to the at least one play group is received.

At block 302, the adding of an identification of the second playlist to a graphic label of the at least one play group is controlled respectively.

At block 303, the adding of the second playlist to playlists of the at least one play group is controlled respectively.

At block 304, the at least one playing device within the at least one play group is controlled respectively to play playing files of the second playlist which has been added to the playlists of the at least one play group in sequence.

Since a playlist is set independently of a play group, one playlist can be added to multiple play groups. The procedure thereof is similar to the one described above and will not be repeated any more. Similarly, a playlist of a play group can be removed without affecting other play groups to continue playing files of the playlist.

As can be seen from the method for controlling grouping play described in the above implementation, a playlist is set independently of a play group, and one or more playlists can be applied to one or more play groups according to actual needs. Adjustment on the play group can be achieved without affecting the playlist; one playlist can be added to multiple play groups through operations on graphic labels of the play group and the playlist on the user interface of the terminal.

Implementation 4

Figure 6:
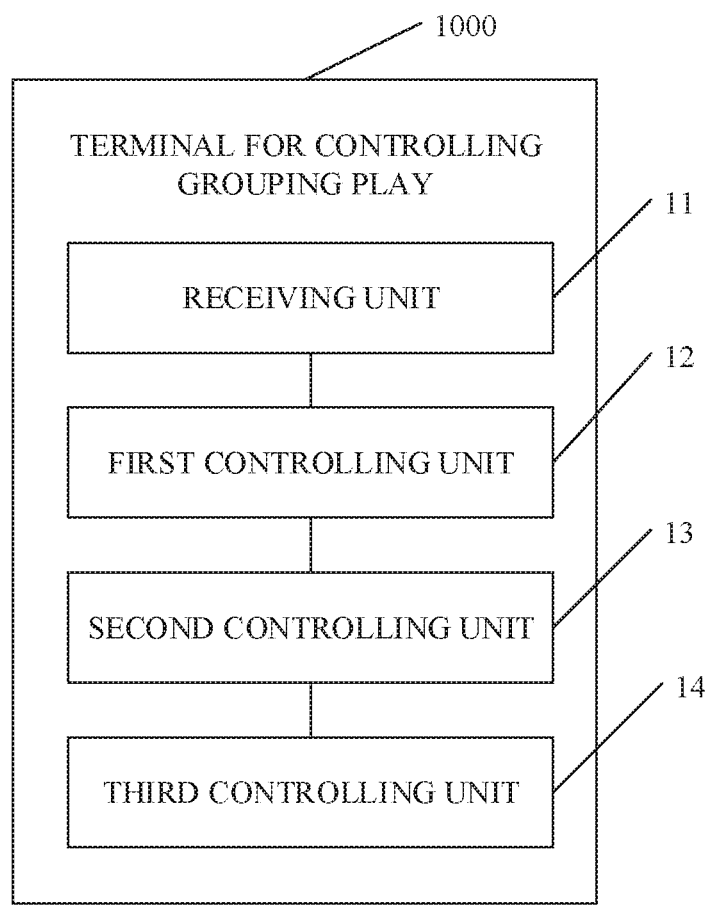
FIG. 6 is a schematic structure diagram illustrating a terminal for controlling grouping play of a playing system according to an implementation of the present disclosure.

A terminal for controlling grouping play of a playing system will be described with refers to FIG. 6. FIG. 6 is a schematic structure diagram illustrating the terminal according to an implementation of the present disclosure. The playing system includes at least one play group and each play group includes at least one playing device; the at least one playing device within the at least one play group is connected via a wireless network. The terminal 1000 includes a receiving unit 11, a first controlling unit 12, a second controlling unit 13, and a third controlling unit 14, which will be described in detail below.

The receiving unit 11 can be a receiver and is configured to receive an adding/removing operation of a first playlist with regard to a first play group on a user interface of the terminal.

In this implementation, each play group within the playing system is controlled through an intelligent terminal. Play groups and playlists are set independently. As reflected on the user interface of the terminal, a graphic label of one or more play groups and a graphic label of one or more playlists are displayed thereon; each play group or playlist is displayed as a graphic label occupying a certain display area on the user interface, the graphic label is generally rectangular, or can be designed to have a circular or other shapes.

According to this implementation, one or more play groups (can be referred to as "playing device group" either) can be created for a playing system, and one or more playing devices can be included in each play group. As to a playing device which does not belong to any play group, it will be regarded as an independent play group. Name and status information of a play group (mainly, name and status information, such as playing or pause, of a currently played playing file in the play group) is displayed in the graphic label thereof. If a play group has no playlist, the status information of the group will be null. Through clicking the graphic label of the play group, user can enter into an information interface of the play group, on which more detailed information of the playing device will be displayed, and through the information displayed, user can know which playing devices constitute the play group, and can browse or edit playlists of the play group and so on.

According to this implementation, one or more playlists can be created for a playing system, and each playlist includes information of several playing files which can be played by playing devices of the playing system. Playing file information includes name and memory address of a corresponding playing file. The playlist is set independently of the play group and does not relate to the play group. The graphic label of each playlist can adopt a unique identification, which can be the pattern or color of the graphic label.

A user interface is shown in FIG. 2a, on the left side thereof are graphic labels of Play group 1-3, and on the right side are graphic labels of Playlist A-D. The graphic label of an idle play group is null. Graphic labels of Playlist A-D are identified through different patterns respectively.

As shown in FIG. 2b, Playlist A is being dragged to Play Group 1 on the user interface by user; thereafter that the receiving unit 11 will receive an adding operation of Playlist A with regard to Play Group 1 on the user interface thereof. Removing operation, that is, dragging from Play group 1 to Playlist A, is an opposite operation of adding operation and will be described in detail later.

The first controlling unit 12 can be a controller and is configured to control to add or remove an identification of the first playlist to/from a graphic label of the first play group.

After receiving the adding operation of Playlist A with regard to Play Group 1 on the user interface of the terminal by the receiving unit 11, the first controlling unit 12 will control to add the identification of Playlist A to the graphic label of Play group 1. Further refer to FIG. 2b, the result obtained by dragging Playlist A to Play Group 1 is illustrated on the right side of FIG. 2b, as shown in the figure, the pattern of Playlist A is displayed in the graphic label of Play group 1.

The second controlling unit 13 can be controller and is configured to control the first play group to add the first playlist to playlists of the first play group or remove the first playlist from the playlists of the first play group.

After the first controlling unit 12 controls to add the pattern of playing device A to the graphic label of Play group 1, the second controlling unit 13 will be triggered to control Play group 1 to add Playlist A to the existing playlists of Play group 1. Removing is an opposite operation, that is, remove Playlist A from the playlists of Play group 1.

The third controlling unit 14 can be controller and is configured to control at least one playing device within the first play group to play playing files of the first playlist which has been added to the playlist of the first play group in sequence, or stop playing the playing files of the first playing device which has been removed.

After adding Playlist A to Play Group 1, Playlist A will be arrayed in the playlists of Play group 1 according to a predetermined rule, for example, arrayed after the existing playlists of Play group 1. One or more playing devices within Play group 1 will be controlled by the third controlling unit 14 to play playing files within the playlists of Play group 1 in sequence. If Playlist A is removed from the playlists of Play group 1 and if a playing file of Playlist A is being played by a playing device of Play group 1, proceed to a playing file of the next playlist arrayed after Playlist A to play.

One playlist can be added to different play groups. As shown in FIG. 2c, in addition to Play Group 1, Playlist A can be added to Play Group 2 either.

Operations such as add or deletion on playing devices within Play group 1 have no affects on playlists, and no adjustment on the playlists is needed.

As can be seen, a playlist is set independently of a play group, and one or more playlists can be applied to one or more play groups according to actual needs. Adjustment on the play group can be achieved without affecting the playlist. Add or removal of the playlist with regard to the play group can be performed through operations on a graphic label of the play group and a graphic label of the playlist on a user interface of a terminal.

Implementation 5

As another implementation, the playing device lists of the first playing device group already includes a second playing device list, and an identification of the second playing device list is displayed on the graphic label of the first playing device group. A difference between this implementation and the implementation described above lies in that, this implementation relates to add multiple playlists to the same play group. In other words, the terminal of implementation 5 is applicable to a scene in which there is a playlist (such as the second playlist) already included in a play group that is configured to add or accept a new playlist.

In this case, the terminal can have the same structure as the terminal of implementation 4, and the receiving unit 11 is further configured to receive an adding operation of a first playlist with regard to a first play group on a user interface of a terminal.

The first controlling unit 12 is further configured to control to display an identification of the first playlist and the identification of the second playlist in different areas of the graphic label of the first play group.

As shown on the left side of FIG. 4a, Playlist A is already included in playlists of Play group 1, in this case, the graphic label of Playlist B can still be dragged such that the pattern thereof can be dragged into Play Group 1. After identifying the dragging operation, the receiving unit 11 will receive the adding operation of Playlist B with regard to Play Group 1. After dragging, as shown on the right side of FIG. 4a, the first controlling unit 12 controls to display a pattern of the existing Playlist A and a pattern of the new Playlist B respectively in different areas of the graphic label of Play group 1.

As one implementation, the second controlling unit 13 is further configured to send a request configured to acquire the first playlist to the first play group whereby the first play group can acquire the first playlist, and control the first play group to add the first playlist after the second playlist.

After the pattern of Playlist B is displayed in the graphic label of Play group 1, the second controlling unit 13 triggers to send a request configured to acquire Playlist B to Play Group 1, whereby Play group 1 can acquire Playlist B and add it after the existing Playlist A. Playlists can be stored in a memory of the playing system, a cloud server, a terminal, or some playing device. Any play group can acquire a playlist based on a memory address thereof.

As one implementation, the third controlling unit 14 is further configured to control at least one playing device within the first play group to play playing files of the first playlist which has been added to the playlists of the first play group in sequence.

Playlist B is added after the existing Playlist A by Play group 1, after that, playing devices in Play group 1 will be controlled to play each playing file in Playlist A and Playlist B in sequence synchronously.

Similarly, removing operation on a playlist can also be conducted. As shown on the left side of FIG. 4b, through dragging Playlist A of Play group 1 to any blank place on the user interface, the terminal can receive a removing operation on Playlist A with regard to Play Group 1. As shown on the right side of FIG. 4b, after dragging, only the pattern of Playlist B is displayed in the graphic label of Play group 1 and Playlist A has been removed from playlists of Play group 1.

As shown on the left side of FIG. 4c, removing operation on Playlist B with regard to Play Group 1 can be conducted either. Through dragging Playlist B of Play group 1 to any blank place on the user interface, the terminal can receive the removing operation on Playlist B with regard to Play Group 1; as shown on the right side of FIG. 4c, after dragging, the graphic label of Play group 1 is blank, and at this time, playlists of Play group 1 are null.

With aid of technical schemes of the above implementation, a playlist can be added to play group conveniently. The new playlist will be arrayed after the existing playlists of the play group and each playing device within the play group take turns to play playing files in each playlist.

Implementation 6

The terminal of implementation 6 is applicable to a scene where one playlist is configured to be added to multiple play groups. A difference between the present implementation and the implementations described above lies in that, the present implementation relates to add the same playlist to multiple play groups to play.

In this implementation, the terminal can have the same structure as the terminal according to implementation 4, and the receiving unit 11 is further configured to receive an adding operation of a second playlist with regard to at least one play group.

The first controlling unit 12 is further configured to control to add an identification of a second playlist to a graphic label of the at least one play group respectively.

The second controlling unit 13 is further configured to control to add the second playlist to playlists of the at least one play group respectively.

The third controlling unit 14 is further configured to control respectively at least one playing device within the at least one play group to play playing files of the second playlist which has been added to the playlists of the at least one play group in sequence.

Since a playlist is set independently of a play group, one playlist can be added to multiple play groups. The procedure thereof is similar to the one described above and will not be repeated any more. Similarly, a playlist of a play group can be removed without affecting other play groups to continue playing files of the playlist.

In this implementation, one playlist can be added to multiple play groups through operations on a graphic label of the play group and a graphic label of the playlist on the user interface of the terminal.

Implementation 7

Figure 7:
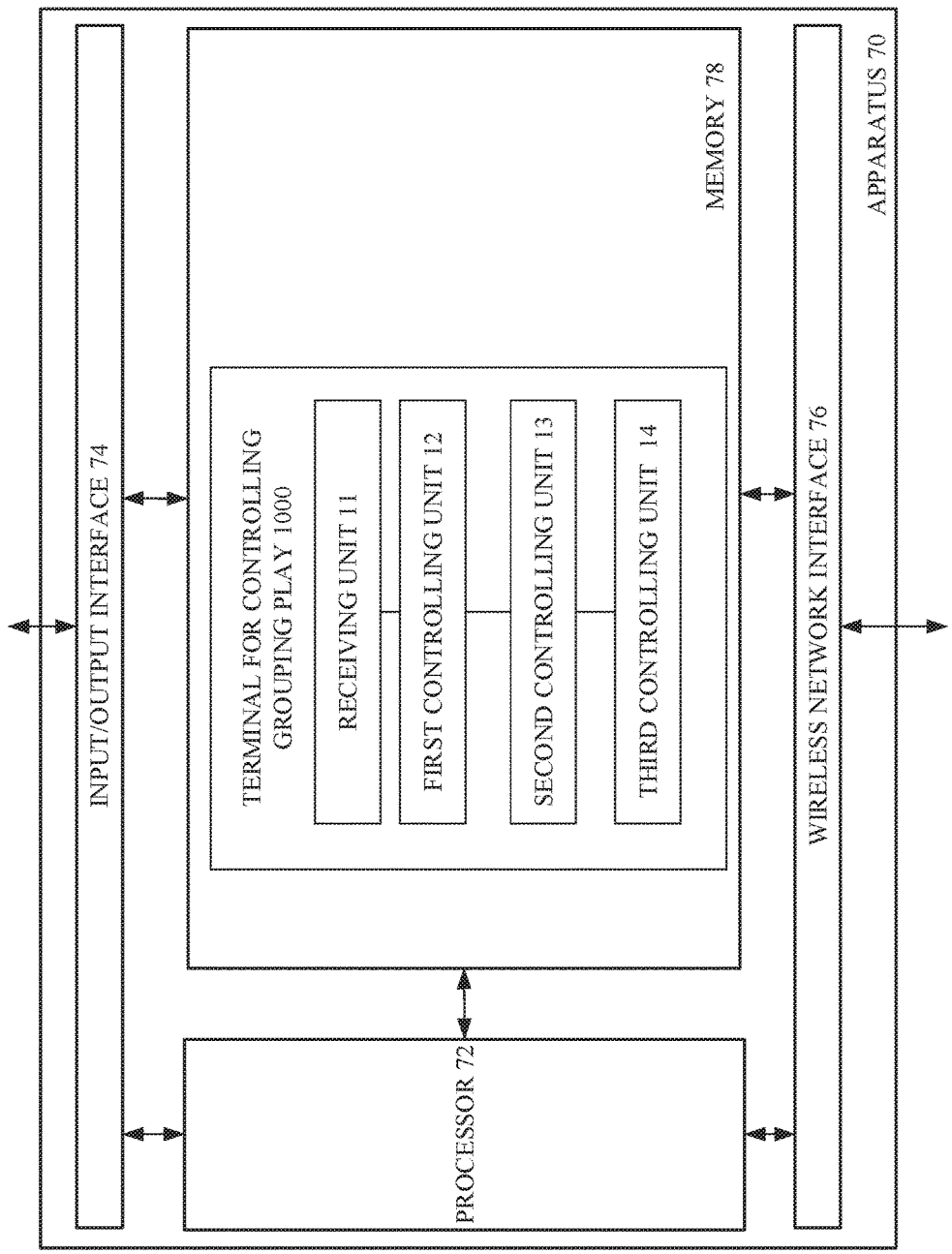
FIG. 7 is a schematic structure diagram illustrating an operation circumstance of hardware of the terminal according to an implementation of the present disclosure.

Implementation 7 of the present disclosure relates to a group playing control apparatus. As shown in FIG. 7, the apparatus a memory 78, one or more processors 72 (for ease of explanation, only one is illustrated in the figure), an Input/output interface 74 and a wireless network interface 76, through which the apparatus can communicate with other equipments. Those well known elements such as display, operating system and the like are not illustrated. The apparatus will be described in detail below with refer to the drawings.

The memory is configured to store program code; when executed by the one or more processors, the program code is adapted to execute the program units as shown in FIG. 6. The communication relationship between the components illustrated in FIG. 6 and other hardware, interface, or circuit is illustrated in FIG. 7. For details of operations of the units, please refer to the above mentioned implementations, and it will not be repeated here.

It should be noted that, for each method of the aforementioned implementations, for ease of description, it has been referred to as a combination of a series of actions, those skilled in the art should be aware that this disclosure is not restricted by the sequence of the actions, in contrast, some steps can be performed in other sequence or simultaneously. In addition, those skilled in the art should also be aware that the implementations described herein are exemplary implementations only, operations and units involved are not necessarily for the implementation of the present disclosure.

Description of each implementation focus on different technical schemes; for contents did not described in detail in one implementation, please refer to relative descriptions in other implementations.

Those skilled in the art should be appreciated that the present disclosure can be implemented through hardware, firmware, or a combination thereof. When implemented via software, the above mentioned functions can be stored in a computer readable medium or can be transmitted as one or more instruction or code on the computer readable storage medium. The computer readable storage medium includes computer storage medium and communication medium, among which the communication medium includes any medium used to transmit computer program from one direction to another place. The storage medium can be any available medium that is accessible to the computer. The computer readable storage medium includes but not limited to read only memory (ROM), random access memory (RAM), electrically erasable programmable read-only memory (EEPROM), compact disc read-only memory (CD-ROM) or other CD storage medium, disk storage medium, magnetic storage devices, or any other medium which can be used to carry or store program code in a desired structural form of instruction or data and is accessible to a computer. In addition, the computer readable medium includes any form of connection. For example, if software is transmitted from websites, servers, or other remote sources through coaxial cable, optical fiber cable, twisted-pair wires, digital subscriber line (DSL), or wireless technologies such as Infrared, wireless, microwave and so on, then coaxial cable, optical fiber cable, twisted-pair wires, DSL, or wireless technologies such as Infrared, wireless, microwave should be included in the definition of storage medium. As used herein, disk or disc includes CD, laser disc, DVD, Floppy disk and Blue-ray Disc, usually, disk copies data via magnetic, while disc copies data by laser optically. Combinations of the mediums described above fall into the protective scope of the computer readable medium of the present disclosure either.

The foregoing descriptions are merely preferred implementations of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A method for controlling grouping play of a playing system, the playing system comprising at least one playing device group and each playing device group comprising at least one playing device, the at least one playing device within the at least one playing device group configured to connect via a wireless network, the method comprising:
    receiving an adding or removing operation of a first playlist with regard to a first playing device group on a user interface of a terminal, wherein the user interface simultaneously displays a graphic label of the at least one playing device group and graphic labels of at least two playlists, the graphic labels of the at least two playlists each configured to have an exclusive identification respectively, wherein the exclusive identification of the graphic label of each of the at least two playlists each comprise an exclusive color;
    in response to controlling to add the identification of the first playlist to the graphic label of the first playing device group:
        modifying the graphic label of the first playing device group by incorporating the exclusive identification of the first playlist into the graphic label of the first playing device group;
        controlling the first playing device group to add the first playlist to playlists of the first playing device group;
    in response to controlling to add the identification of the second playlist to the graphic label of the first playing device group:
        modifying the graphic label of the first playing device group by merging the exclusive identification of the second playlist into the graphic label of the first playing device group so as to display the exclusive identifications of the first and second playlists in the graphic label of the first playing device group; and
        controlling the first playing device group to add the second playlist to playlists of the first playing device group; and
    controlling at least one playing device within the first playing device group to play playing files of the first and second playlists which have been added to the playlists of the first playing device group in sequence.

2. The method of claim 1, wherein controlling the first playing device group to add the first playlist to the playlists of the first playing device group comprises:
    sending a request configured to acquire the first playlist to the first playing device group, wherein the first playing device group can acquire the first playlist and adds the playlist to the playlists of the first playing device group.

3. The method of claim 1, wherein
    the playlists of the first playing device group comprise a third playlist, and an identification of the second playlist is displayed on the graphic label of the first playing device group;

wherein controlling to add the identification of the first playlist to the graphic label of the first playing group comprises:

controlling to display the identification of the first playlist and the identification of the third playlist in different areas of the graphic label of the first playing device group; and wherein controlling the first playing device group to add the first playlist to the playlists of the first playing device group comprises:

controlling the first playing device group to add the first playlist after the third playlist.

4. The method of claim 1, further comprising, receiving an adding operation of a third playlist with regard to the at least one playing device group;

controlling to add an identification of the third playlist to a graphic label of the at least one playing device group respectively;

controlling the at least one playing device group to add the third playlist to playlists of the at least one playing device group respectively; and controlling at least one playing device within the at least one playing device group to play playing files of the third playlist which has been added to the playlists of the at least one playing device group.

5. The method of claim 1, wherein before controlling the one or more playing device groups to add the first playlist to the playlists of the one or more playing device groups respectively, the method further comprises:

sending a request configured to acquire the first playlist to the one or more playing device groups respectively, wherein the one or more playing device groups acquires the first playlist.

6. A terminal for controlling grouping play of a playing system, the playing system comprising at least one playing device group and each playing device group comprising at least one playing device, the at least one playing device within the at least one playing device group configured to connect via a wireless network, the terminal comprising:

one or more processors;

a memory, configured to store program codes, wherein when executed by the one or more processors, the program codes are adapted to cause the one or more processors to perform the following program units:

a receiving unit, configured to receive an adding or removing operation of a first playlist with regard to a first playing device group on a user interface of a terminal, wherein the user interface simultaneously displays a graphic label of the at least one playing device group and graphic labels of at least two playlists, the graphic labels of the at least two playlists each configured to have an exclusive identification respectively, wherein the exclusive identification of the graphic label of each of the at least w playlists each comprise an exclusive color;

a first controlling unit, configured to modify the graphic label of the first playing device group by incorporating the exclusive identification of the first playlist into the graphic label of the first playing device group in response to controlling to add the identification of the first playlist to the graphic label of the first playing device group;

a second controlling unit, configured to control the first playing device group to add the first playlist to playlists of the first playing device group; and wherein the first controlling unit is further configured to modify the graphic label of the first playing device group by merging the exclusive identification of a second playlist into the graphic label of the first playing device group so as to display the exclusive identifications of the first and second playlists in the graphic label of the first playing device group in response to controlling to add the identification of the second playlist to the graphic label of the first playing device group; and wherein the second controlling unit is further configured to control the first playing device group to add the second playlist to playlists of the first playing device group; and a third control unit, configured to control at least one playing device within the first playing device group to play playing files of the first and second playlists which have been added to the playlists of the first playing device group in sequence.

7. The terminal of claim 6, wherein the second controlling unit is configured to send a request configured to acquire the first playlist to the first playing device group, wherein the first playing device group acquires the first playlist and adds the playlist to the playlists of the first playing device group.

8. The terminal of claim 6, wherein the playlists of the first playing device group comprise a third playlist, and an identification of the third playlist is displayed on the graphic label of the first playing device group;

the first controlling unit is configured to control to display the identification of the first playlist and the identification of the third playlist in different areas of the graphic label of the first playing device group; and the second controlling unit is configured to control the first playing device group to add the first playlist after the third playlist.

9. The terminal of claim 6, wherein the receiving unit is further configured to receive an adding operation of a third playlist with regard to the at least one playing device group;

the first controlling unit is further configured to add an identification of the third playlist to a graphical label of the at least one playing device group respectively;

the second controlling unit is further configured to control the at least one playing device group to add the third playlist to playlists of the at least one playing device group respectively; and the third controlling unit is further configured to control the at least one playing device within the at least one playing device group to play playing files of the third playlist which has been added to the playlists of the at least one playing device group in sequence.

* * * * *